US009967201B2

(12) United States Patent
Xu et al.

(10) Patent No.: US 9,967,201 B2
(45) Date of Patent: May 8, 2018

(54) DATA TRANSMISSION METHOD, CORE FORWARDING DEVICE, AND ENDPOINT FORWARDING DEVICE

(71) Applicant: Huawei Technologies Co., Ltd., Shenzhen (CN)

(72) Inventors: Dong Xu, Hangzhou (CN); Fu Wang, Beijing (CN); Pei Wu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 69 days.

(21) Appl. No.: 15/185,355

(22) Filed: Jun. 17, 2016

(65) Prior Publication Data

US 2016/0294709 A1 Oct. 6, 2016

Related U.S. Application Data

(63) Continuation of application No. PCT/CN2014/086470, filed on Sep. 15, 2014.

(30) Foreign Application Priority Data

Dec. 20, 2013 (CN) .......................... 2013 1 0713743

(51) Int. Cl.
*H04W 4/00* (2018.01)
*H04L 12/851* (2013.01)
(Continued)

(52) U.S. Cl.
CPC ........ *H04L 47/2441* (2013.01); *H04L 12/413* (2013.01); *H04L 12/4633* (2013.01);
(Continued)

(58) Field of Classification Search
None
See application file for complete search history.

(56) References Cited

U.S. PATENT DOCUMENTS 7,929,565 B2 * 4/2011 Winter ................ H04L 12/4633
370/252
2004/0085951 A1 5/2004 Rezaiifar et al.
(Continued)

FOREIGN PATENT DOCUMENTS

CN 1494003 A 5/2004
CN 1697425 A 11/2005
(Continued)

OTHER PUBLICATIONS

Partial English Translation and Abstract of Chinese Patent Application No. CN103701710, dated Jun. 29, 2016, 3 pages.
(Continued)

*Primary Examiner* — Zewdu A Beyen
(74) *Attorney, Agent, or Firm* — Conley Rose, P.C.

(57) ABSTRACT

A data transmission method, a core forwarding device, and an endpoint forwarding device, where the data transmission method includes, an end-to-end flow control technology that is established between a core device and an endpoint device of a system using the core forwarding device and the endpoint forwarding device, resolving a technical problem in the prior art that a uniform back pressure is generated in an entire data transmission link when any endpoint device generates back pressure when peripheral component interconnect express (PCIe) data is transmitted through the Ethernet, thereby achieving technical effects of increasing bandwidth utilization of the entire system and increasing the data transmission efficiency.

16 Claims, 10 Drawing Sheets

(51) Int. Cl.
*H04L 12/413* (2006.01)
*H04L 12/24* (2006.01)
*H04L 12/741* (2013.01)
*H04L 12/861* (2013.01)
*H04L 29/12* (2006.01)
*H04L 29/06* (2006.01)
*H04L 12/46* (2006.01)

(52) U.S. Cl.
CPC ........ *H04L 41/0896* (2013.01); *H04L 45/745* (2013.01); *H04L 49/9063* (2013.01); *H04L 61/2592* (2013.01); *H04L 69/22* (2013.01)

(56) References Cited

U.S. PATENT DOCUMENTS

| | | | |
|---|---|---|---|
| 2005/0270976 A1 | 12/2005 | Yang et al. | |
| 2008/0052431 A1 | 2/2008 | Freking et al. | |
| 2008/0117909 A1* | 5/2008 | Johnson | G06F 13/387 370/392 |
| 2008/0195747 A1* | 8/2008 | Elmaliah | H04L 29/06 709/232 |
| 2009/0154469 A1* | 6/2009 | Winter | H04L 12/4633 370/395.53 |
| 2010/0257302 A1* | 10/2010 | Suzuki | G06F 13/4027 710/314 |
| 2012/0110233 A1* | 5/2012 | Higuchi | G06F 13/4022 710/313 |
| 2013/0205053 A1* | 8/2013 | Harriman | G06F 13/4022 710/105 |
| 2013/0223438 A1* | 8/2013 | Tripathi | H04L 45/66 370/355 |
| 2013/0227108 A1 | 8/2013 | Dunbar et al. | |
| 2013/0268694 A1* | 10/2013 | Campbell | G06F 13/20 710/8 |
| 2013/0322453 A1 | 12/2013 | Allan | |
| 2015/0172103 A1* | 6/2015 | DeCusatis | H04L 41/0681 370/389 |
| 2015/0317280 A1* | 11/2015 | Magro | G06F 15/17 710/301 |

FOREIGN PATENT DOCUMENTS

| | | |
|---|---|---|
| CN | 101022414 A | 8/2007 |
| CN | 101131683 A | 2/2008 |
| CN | 101335714 A | 12/2008 |
| CN | 103701710 A | 4/2014 |
| EP | 1041792 A2 | 10/2000 |

OTHER PUBLICATIONS

Foreign Communication From A Counterpart Application, European Application No. 14871578.2, Extended European Search Report dated Nov. 9, 2016, 9 pages.
Foreign Communication From A Counterpart Application, Chinese Application No. 201310713743.9, Chinese Office Action dated Apr. 6, 2016, 6 pages.
Foreign Communication From A Counterpart Application, PCT Application No. PCT/CN2014/086470, English Translation of International Search Report dated Dec. 22, 2014, 2 pages.
Foreign Communication From A Counterpart Application, PCT Application No. PCT/CN2014/086470, English Translation of Written Opinion dated Dec. 22, 2014, 6 pages.

* cited by examiner

DATA TRANSMISSION METHOD, CORE FORWARDING DEVICE, AND ENDPOINT FORWARDING DEVICE

CROSS-REFERENCE TO RELATED APPLICATIONS

This application is a continuation of International Application No. PCT/CN2014/086470, filed on Sep. 15, 2014, which claims priority to Chinese Patent Application No. 201310713743.9, filed on Dec. 20, 2013, both of which are hereby incorporated by reference in their entireties.

TECHNICAL FIELD

The present disclosure relates to the field of data transmission, and in particular, to a data transmission method, a core forwarding device, and an endpoint forwarding device.

BACKGROUND

Peripheral component interconnect-express (PCIe) draws increasing attention because of its high data transmission rate, for example, a highest rate of PCIe 16X 2.0 can reach 10 gigabyte per second (GB/s). However, a transmission distance of PCIe is relatively short, and a typical transmission distance is 15 to 30 centimeter (cm), which limits an application scope of a PCIe device. Currently, extended transmission of PCIe data can be implemented through the Ethernet, increasing the transmission distance of PCIe, thereby expanding an application scope of a PCIe device.

In the prior art, when PCIe data is transmitted through the Ethernet, there is a technical problem that a uniform back pressure is generated in an entire data transmission link if any endpoint device generates back pressure.

SUMMARY

Embodiments of the present disclosure provide a data transmission method, to resolve a technical problem that exists in the prior art when PCIe data is transmitted through the Ethernet, a uniform back pressure is generated in an entire data transmission link if any endpoint device generates back pressure.

According to a first aspect of the present disclosure, an embodiment of the present disclosure provides a data transmission method, where the method includes receiving, by a core forwarding device through a first virtual channel in a PCIe channel, a first PCIe packet sent by a core device, where a first traffic class of the first PCIe packet is allocated by the core device according to a destination-end device of the first PCIe packet, where the first traffic class is in a one-to-one correspondence with the destination-end device, and the first virtual channel is in a one-to-one correspondence with the first traffic class, encapsulating, by the core forwarding device according to the destination-end device, the first PCIe packet into a first Ethernet frame that has a first priority, sending, by the core forwarding device, the first Ethernet frame to a network switching device through a first-priority channel that is in a one-to-one correspondence with the first priority and is in an Ethernet channel when a first-priority buffer that stores the first Ethernet frame is not under back pressure, receiving, by the core forwarding device through a second-priority channel in the Ethernet channel, a second Ethernet frame sent by the network switching device, where a second priority of the second Ethernet frame is in a one-to-one correspondence with the second-priority channel, parsing, by the core forwarding device, the second Ethernet frame to obtain a second PCIe packet, where a second traffic class of the second PCIe packet is in a one-to-one correspondence with a source-end device of the second PCIe packet, and sending the second PCIe packet to the core device through a second virtual channel that is in a one-to-one correspondence with the second traffic class and is in the PCIe channel when a first sending buffer that stores the second PCIe packet is not under back pressure.

With reference to the first aspect, in a first possible implementation manner, the method further includes receiving, by the core forwarding device through the first-priority channel, a first back pressure signal sent by the network switching device after the first Ethernet frame is sent to the network switching device through the first-priority channel that is in a one-to-one correspondence with the first priority and is in the Ethernet channel, stopping, by the core forwarding device according to the first back pressure signal, sending the first PCIe packet to the network switching device through the first-priority channel, generating, by the core forwarding device, a second back pressure signal according to the first back pressure signal, sending the second back pressure signal to the core device through the first virtual channel, receiving, by the core forwarding device through the second virtual channel, a third back pressure signal sent by the core device after the second PCIe packet is sent to the core device through the second virtual channel that is in a one-to-one correspondence with the second traffic class and is in the PCIe channel, stopping, by the core forwarding device according to the third back pressure signal, sending the second PCIe packet to the core device through the second virtual channel, generating, by the core forwarding device, a fourth back pressure signal according to the third back pressure signal, and sending the fourth back pressure signal to the network switching device through the second-priority channel.

With reference to the first possible implementation manner, in a second possible implementation manner, a sending buffer of the core forwarding device includes a first-type sending buffer and a second-type sending buffer, where the first-type sending buffer is a buffer that is in a one-to-one correspondence with a specified virtual channel when the core forwarding device receives a specified packet through the specified virtual channel in the PCIe channel, and the second-type sending buffer is another buffer, other than the first-type sending buffer, in the sending buffer of the core forwarding device, and generating, by the core forwarding device, a second back pressure signal according to the first back pressure signal further includes generating, by the core forwarding device, the second back pressure signal when the first back pressure signal is to exert back pressure on the first-type sending buffer, and when a volume of data stored in the first-type sending buffer exceeds a first threshold, or generating, by the core forwarding device, the second back pressure signal when the first back pressure signal is to exert back pressure on the second-type sending buffer, and when a volume of data stored in the second-type sending buffer exceeds the first threshold.

With reference to the second possible implementation manner, in a third possible implementation manner, after generating, by the core forwarding device, the second back pressure signal when the first back pressure signal is to exert back pressure on the second-type sending buffer, and when a volume of data stored in the second-type sending buffer exceeds the first threshold, the method further includes generating, by the core forwarding device, a specified back pressure signal, to exert back pressure on a first PCIe sending buffer in the core device when the capacity of the data stored in the second-type sending buffer exceeds a second threshold, where the second threshold is greater than the first threshold.

According to a second aspect of the present disclosure, an embodiment of the present disclosure provides a data transmission method, where the method includes receiving, by an endpoint forwarding device through a first-priority channel in an Ethernet channel, a first Ethernet frame sent by a network switching device, where the first Ethernet frame has a first priority that is in a one-to-one correspondence with the first-priority channel, parsing, by the endpoint forwarding device, the first Ethernet frame to obtain a first PCIe packet, where a first traffic class of the first PCIe packet is in a one-to-one correspondence with a destination-end device of the first PCIe packet, sending, by the endpoint forwarding device, the first PCIe packet to an endpoint device through a PCIe channel when a first sending buffer that stores the first PCIe packet is not under back pressure, where the endpoint device is consistent with the destination-end device, receiving, by the endpoint forwarding device through the PCIe channel, a second PCIe packet sent by the endpoint device, where a second traffic class of the second PCIe packet is in a one-to-one correspondence with the endpoint device, encapsulating, by the endpoint forwarding device according to the endpoint device, the second PCIe packet into a second Ethernet frame that has a second priority, and sending, by the endpoint forwarding device, the second Ethernet frame to the network switching device through a second-priority channel that is in a one-to-one correspondence with the second priority and is in the Ethernet channel when a second-priority buffer that stores the second Ethernet frame is not under back pressure.

With reference to the second aspect, in a first possible implementation manner, the method further includes receiving, by the endpoint forwarding device through the PCIe channel, a first back pressure signal sent by the endpoint device after the first PCIe packet is sent to the endpoint device through the PCIe channel, stopping, by the endpoint forwarding device, sending the first PCIe packet to the endpoint device through the PCIe channel, generating, by the endpoint forwarding device, a second back pressure signal according to the first back pressure signal, sending the second back pressure signal to the network switching device through the first-priority channel, stopping, by the endpoint forwarding device, sending the second Ethernet frame to the network switching device through the second-priority channel after the second Ethernet frame is sent to the network switching device through the second-priority channel that is in a one-to-one correspondence with the second priority and is in the Ethernet channel, after receiving, through the second-priority channel, a third back pressure signal sent by the network switching device, generating, by the endpoint forwarding device, a fourth back pressure signal according to the third back pressure signal, and sending the fourth back pressure signal to the endpoint device through the PCIe channel.

With reference to the first possible implementation manner, in a second possible implementation manner, generating, by the endpoint forwarding device, a fourth back pressure signal according to the third back pressure signal further includes generating, by the endpoint forwarding device, the fourth back pressure signal according to the third back pressure signal when a sending buffer of the endpoint forwarding device reaches a first threshold.

According to a third aspect of the present disclosure, an embodiment of the present disclosure further provides a core forwarding device, including a PCIe processing module configured to receive, through a first virtual channel in a PCIe channel, a first PCIe packet sent by a core device, where a first traffic class of the first PCIe packet is allocated by the core device according to a destination-end device of the first PCIe packet, where the first traffic class is in a one-to-one correspondence with the destination-end device, and the first virtual channel is in a one-to-one correspondence with the first traffic class, and an Ethernet processing module configured to encapsulate, according to the destination-end device, the first PCIe packet into a first Ethernet frame that has a first priority, send the first Ethernet frame to a network switching device through a first-priority channel that is in a one-to-one correspondence with the first priority and is in an Ethernet channel when a first-priority buffer that stores the first Ethernet frame is not under back pressure, where the Ethernet processing module is further configured to receive, through a second-priority channel in the Ethernet channel, a second Ethernet frame sent by the network switching device, where a second priority of the second Ethernet frame is in a one-to-one correspondence with the second-priority channel, and parse the second Ethernet frame to obtain a second PCIe packet, where a second traffic class of the second PCIe packet is in a one-to-one correspondence with a source-end device of the second PCIe packet, and the PCIe processing module is further configured to send the second PCIe packet to the core device through a second virtual channel that is in a one-to-one correspondence with the second traffic class and is in the PCIe channel when a first sending buffer that stores the second PCIe packet is not under back pressure.

With reference to the third aspect, in a first possible implementation manner, the Ethernet processing module is further configured to receive, through the first-priority channel, a first back pressure signal sent by the network switching device after the first Ethernet frame is sent to the network switching device through the first-priority channel that is in a one-to-one correspondence with the first priority and is in the Ethernet channel, and stop, according to the first back pressure signal, sending the first PCIe packet to the network switching device through the first-priority channel, and the PCIe processing module is further configured to generate a second back pressure signal according to the first back pressure signal, and send the second back pressure signal to the core device through the first virtual channel, and after the second PCIe packet is sent to the core device through the second virtual channel that is in a one-to-one correspondence with the second traffic class and is in the PCIe channel, the PCIe processing module is further configured to receive, through the second virtual channel, a third back pressure signal sent by the core device, and stop, according to the third back pressure signal, sending the second PCIe packet to the core device through the second virtual channel, and the PCIe processing module is further configured to generate a fourth back pressure signal according to the third back pressure signal, and send the fourth back pressure signal to the network switching device through the second-priority channel.

With reference to the first possible implementation manner, in a second possible implementation manner, a sending buffer of the core forwarding device includes a first-type sending buffer and a second-type sending buffer, where the first-type sending buffer is a buffer that is in a one-to-one correspondence with a specified virtual channel when the core forwarding device receives a specified packet through the specified virtual channel in the PCIe channel, and the second-type sending buffer is another buffer, other than the first-type sending buffer, in the sending buffer of the core forwarding device, and the PCIe processing module is further configured to generate the second back pressure signal when the first back pressure signal is to exert back pressure on the first-type sending buffer, and when a volume of data stored in the first-type sending buffer exceeds a first threshold, or generate the second back pressure signal when the first back pressure signal is to exert back pressure on the second-type sending buffer, and when a volume of data stored in the second-type sending buffer exceeds the first threshold.

With reference to the second possible implementation manner, in a third possible implementation manner, the PCIe processing module is further configured to, after the second back pressure signal is generated when the first back pressure signal is to exert back pressure on the second-type sending buffer, and when the capacity of the data stored in the second-type sending buffer exceeds the first threshold, generate a specified back pressure signal when the capacity of the data stored in the second-type sending buffer exceeds a second threshold, to exert back pressure on a first PCIe sending buffer in the core device, where the second threshold is greater than the first threshold.

According to a fourth aspect of the present disclosure, an embodiment of the present disclosure further provides an endpoint forwarding device, including an Ethernet processing module configured to receive, through a first-priority channel in an Ethernet channel, a first Ethernet frame sent by a network switching device, where the first Ethernet frame has a first priority that is in a one-to-one correspondence with the first-priority channel, and parse the first Ethernet frame to obtain a first PCIe packet, where a first traffic class of the first PCIe packet is in a one-to-one correspondence with a destination-end device of the first PCIe packet, and a PCIe processing module configured to send the first PCIe packet to an endpoint device through a PCIe channel when a first sending buffer that stores the first PCIe packet is not under back pressure, where the endpoint device is consistent with the destination-end device, where the PCIe processing module is configured to receive, through the PCIe channel, a second PCIe packet sent by the endpoint device, where a second traffic class of the second PCIe packet is in a one-to-one correspondence with the endpoint device, and the Ethernet processing module is configured to encapsulate, according to the endpoint device, the second PCIe packet into a second Ethernet frame that has a second priority, and send the second Ethernet frame to the network switching device through a second-priority channel that is in a one-to-one correspondence with the second priority and is in the Ethernet channel when a second-priority buffer that stores the second Ethernet frame is not under back pressure.

With reference to the fourth aspect, in a first possible implementation manner, the PCIe processing module is configured to receive, through the PCIe channel, a first back pressure signal sent by the endpoint device after the first PCIe packet is sent to the endpoint device through the PCIe channel, and stop sending the first PCIe packet to the endpoint device through the PCIe channel, and the Ethernet processing module is configured to generate a second back pressure signal according to the first back pressure signal, and send the second back pressure signal to the network switching device through the first-priority channel, and the Ethernet processing module is configured to receive, through the second-priority channel, a third back pressure signal sent by the network switching device after the second Ethernet frame is sent to the network switching device through the second-priority channel that is in a one-to-one correspondence with the second priority and is in the Ethernet channel, and stop sending the second Ethernet frame to the network switching device through the second-priority channel, and the PCIe processing module is configured to generate a fourth back pressure signal according to the third back pressure signal, and send the fourth back pressure signal to the endpoint device through the PCIe channel.

With reference to the first possible implementation manner, the PCIe processing module is further configured to generate the fourth back pressure signal according to the third back pressure signal when a sending buffer of the endpoint forwarding device reaches a first threshold.

One or more technical solutions provided in the embodiments of the present disclosure have at least the following technical effects or advantages.

1: A core forwarding device is adopted to receive, through a first virtual channel that is in a one-to-one correspondence with a first traffic class of a first PCIe packet and is in a PCIe channel, the first PCIe packet sent by a core device, where the first traffic class is allocated by the core device according to a destination-end device of the first PCIe packet, where the first traffic class is in a one-to-one correspondence with the destination-end device, and the first virtual channel is in a one-to-one correspondence with the first traffic class, encapsulate, according to the destination-end device of the first PCIe packet, the first PCIe packet into a first Ethernet frame that has a first priority, send the first Ethernet frame to a network switching device through a first-priority channel that is in a one-to-one correspondence with the first priority and is in an Ethernet channel, and receive, through a second-priority channel that is in a one-to-one correspondence with a second priority of a second Ethernet frame and is in the Ethernet channel, the second Ethernet frame sent by the network switching device, parse the second Ethernet frame to obtain a second PCIe packet, where a second traffic class of the second PCIe packet is in a one-to-one correspondence with a source-end device of the second PCIe packet, and send the second PCIe packet to the core device through a second virtual channel that is in a one-to-one correspondence with the second traffic class and is in the PCIe channel such that an end-to-end flow control technology based on a traffic class (where this traffic class is allocated according to different endpoint devices) is formed between the core device and the endpoint device (that is, the source-end device of the second PCIe packet). A data transmission channel between the core device and an endpoint device and a data transmission channel between the core device and another endpoint device do not affect each other. Therefore, a technical problem in the prior art that a uniform back pressure is generated in an entire data transmission link if any endpoint device generates back pressure when PCIe data is transmitted through the Ethernet is resolved, thereby achieving technical effects of increasing bandwidth utilization of the entire system and increasing the data transmission efficiency.

2. When a first back pressure signal is to exert back pressure on a first-type sending buffer, and when a volume of data stored in the first-type sending buffer exceeds a first threshold, the core forwarding device generates a second back pressure signal, or when a first back pressure signal is to exert back pressure on a second-type sending buffer, and when a volume of data stored in the second-type sending buffer exceeds a first threshold, the core forwarding device generates a second back pressure signal such that the core forwarding device does not immediately generate the second back pressure signal when receiving the first back pressure signal, and generates the second back pressure signal only when the first-type sending buffer or the second-type sending buffer exceeds the first threshold, and in this case, the PCIe channel may continue to be used, thereby increasing PCIe bandwidth utilization.

3. When the capacity of the data stored in the second-type sending buffer exceeds a second threshold, the core forwarding device generates a specified back pressure signal, to exert back pressure on a first PCIe sending buffer in the core device, where the second threshold is greater than the first threshold. Therefore, an effect of a specified packet on PCIe bandwidth is reduced.

DESCRIPTION OF EMBODIMENTS

Figure 1:
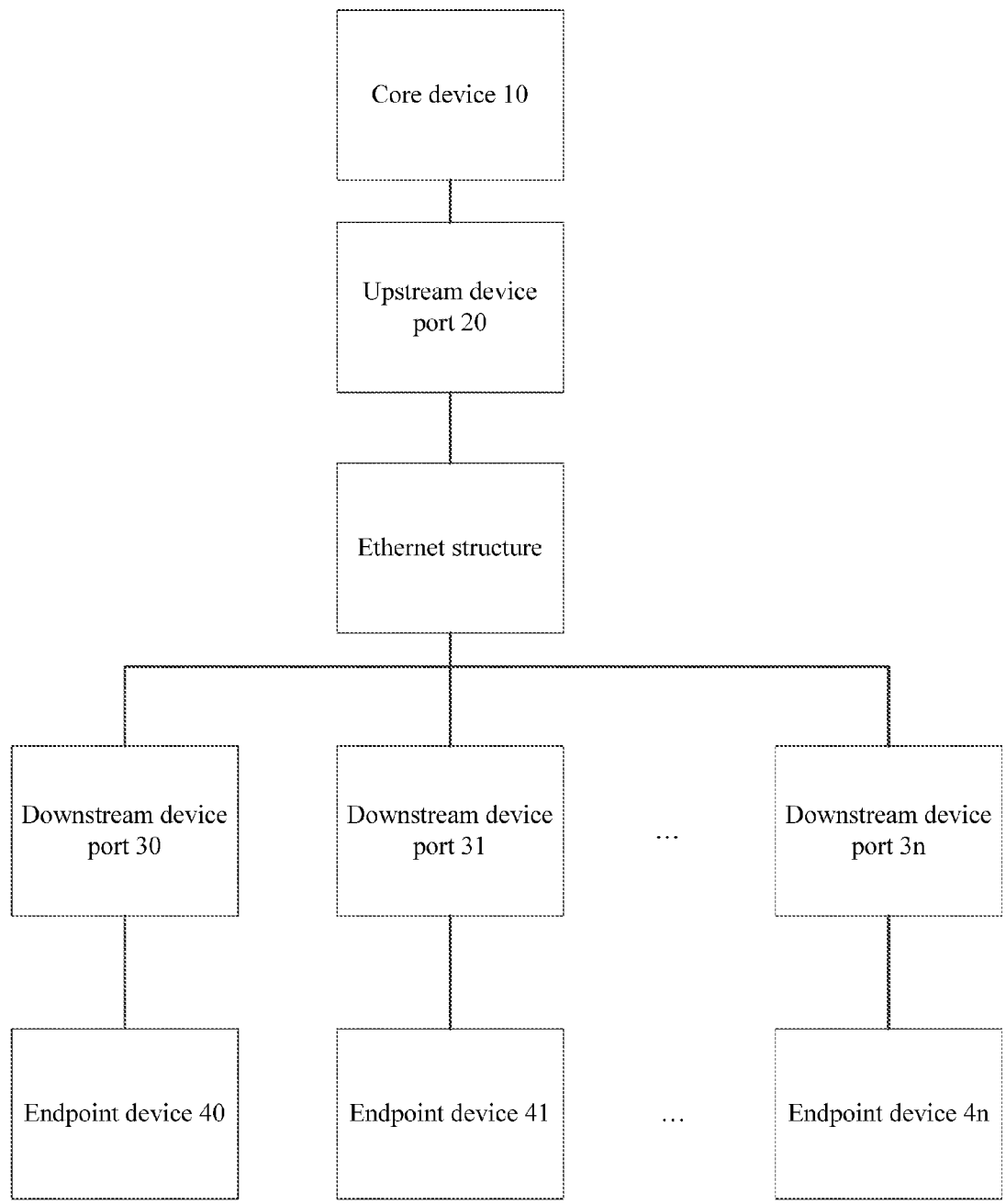
FIG. 1 is a schematic diagram of transmitting PCIe data through the Ethernet.

Before technical solutions in embodiments of the present disclosure are further described, to make a person skilled in the technical field of the present disclosure better understand the technical solutions in the embodiments of the present disclosure, the following first describes, with reference to FIG. 1, a solution in the prior art and a technical problem that exists in the prior art. Specifics are as follows.

Referring to FIG. 1, FIG. 1 is a schematic diagram of transmitting PCIe data through the Ethernet. As shown in FIG. 1, a data transmission system includes a core device 10, an upstream device port 20, an Ethernet structure, multiple downstream device ports, where the downstream device ports may be numbered from 30 to 3n (where n is an positive integer), and multiple endpoint devices, where the multiple endpoint devices may be numbered from 40 to 4n, and the downstream device ports are in one-to-one correspondences with the endpoint devices, for example, a downstream device port 30 is in a one-to-one correspondence with an endpoint device 40, and a downstream device port 31 is in a one-to-one correspondence with an endpoint device 41. PCIe links exist between the core device and the upstream device port and between an endpoint device and a downstream device port, and an Ethernet link exists between the upstream device port and a downstream device port.

Further referring to FIG. 1, in the data transmission system shown in FIG. 1, if the endpoint device 40 generates back pressure, where the back pressure further refers to that a device transiently receives a large amount of data, causing quick consumption of a receiving buffer of the device, when a threshold is exceeded, for example, when a usage proportion of the receiving buffer exceeds a proportion such as ½ or ¾, the device sends a back pressure signal in a direction in which the data enters, that is, to a device that sends the data such that the device that sends the data stops sending or delay sending data. For example, the endpoint device 40 exerts back pressure on the downstream device port 30, then the downstream device port 30 exerts back pressure on the upstream device port 20, and after the upstream device port 20 exerts back pressure on the core device 10, the core device 10 stops services of all the endpoint devices because the core device 10 cannot determine a specific endpoint device that generates back pressure, thereby affecting a service of another endpoint device except the endpoint device 40, for example, when the endpoint device 41 is a storage device, normal storage or read cannot be performed on the endpoint device 41 because the endpoint device 41 cannot receive or send data.

Therefore, in the prior art, a technical problem that when PCIe data is transmitted through the Ethernet, a uniform back pressure is generated in an entire data transmission link if any endpoint device generates back pressure exists.

Therefore, the embodiments of the present disclosure provide a data transmission method, to resolve a technical problem in the prior art that a uniform back pressure is generated in an entire data transmission link if any endpoint device generates back pressure when PCIe data is transmitted through the Ethernet.

An embodiment of the present disclosure provides a data transmission method, where the method includes receiving, by a core forwarding device through a first virtual channel in a PCIe channel, a first PCIe packet sent by a core device, where a first traffic class of the first PCIe packet is allocated by the core device according to a destination-end device of the first PCIe packet, where the first traffic class is in a one-to-one correspondence with the destination-end device, and the first virtual channel is in a one-to-one correspondence with the first traffic class, encapsulating, by the core forwarding device according to the destination-end device, the first PCIe packet into a first Ethernet frame that has a first priority, sending, by the core forwarding device, the first Ethernet frame to a network switching device through a first-priority channel that is in a one-to-one correspondence with the first priority and is in an Ethernet channel when a first-priority buffer that stores the first Ethernet frame is not under back pressure, receiving, by the core forwarding device through a second-priority channel in the Ethernet channel, a second Ethernet frame sent by the network switching device, where a second priority of the second Ethernet frame is in a one-to-one correspondence with the second-priority channel, parsing, by the core forwarding device, the second Ethernet frame to obtain a second PCIe packet, where a second traffic class of the second PCIe packet is in a one-to-one correspondence with a source-end device of the second PCIe packet, and sending, by the core forwarding device, the second PCIe packet to the core device through a second virtual channel that is in a one-to-one correspondence with the second traffic class and is in the PCIe channel when a first sending buffer that stores the second PCIe packet is not under back pressure.

It can be seen from the foregoing that, a core forwarding device is adopted to receive, through a first virtual channel that is in a one-to-one correspondence with a first traffic class of a first PCIe packet and is in a PCIe channel, the first PCIe packet sent by a core device, where the first traffic class is allocated by the core device according to a destination-end device of the first PCIe packet, where the first traffic class is in a one-to-one correspondence with the destination-end device, and the first virtual channel is in a one-to-one correspondence with the first traffic class, encapsulate, according to the destination-end device of the first PCIe packet, the first PCIe packet into a first Ethernet frame that has a first priority, send the first Ethernet frame to a network switching device through a first-priority channel that is in a one-to-one correspondence with the first priority and is in an Ethernet channel, receive, through a second-priority channel that is in a one-to-one correspondence with a second priority of a second Ethernet frame and is in the Ethernet channel, the second Ethernet frame sent by the network switching device, parse the second Ethernet frame to obtain a second PCIe packet, where a second traffic class of the second PCIe packet is in a one-to-one correspondence with a source-end device of the second PCIe packet, and send the second PCIe packet to the core device through a second virtual channel that is in a one-to-one correspondence with the second traffic class and is in the PCIe channel. In this way, an end-to-end flow control technology based on a traffic class (where this traffic class is allocated according to different endpoint devices) is applied between the core device and the endpoint device (that is, the source-end device of the second PCIe packet). A data transmission channel between the core device and an endpoint device and a data transmission channel between the core device and another endpoint device do not affect each other. Therefore, a technical problem in the prior art that a uniform back pressure is generated in an entire data transmission link if any endpoint device generates back pressure when PCIe data is transmitted through the Ethernet is resolved, thereby achieving technical effects of increasing bandwidth utilization of the entire system and increasing the data transmission efficiency.

To better understand the foregoing technical solutions, the following describes the technical solutions in detail with reference to accompanying drawings and specific implementation manners of this specification.

Figure 2:
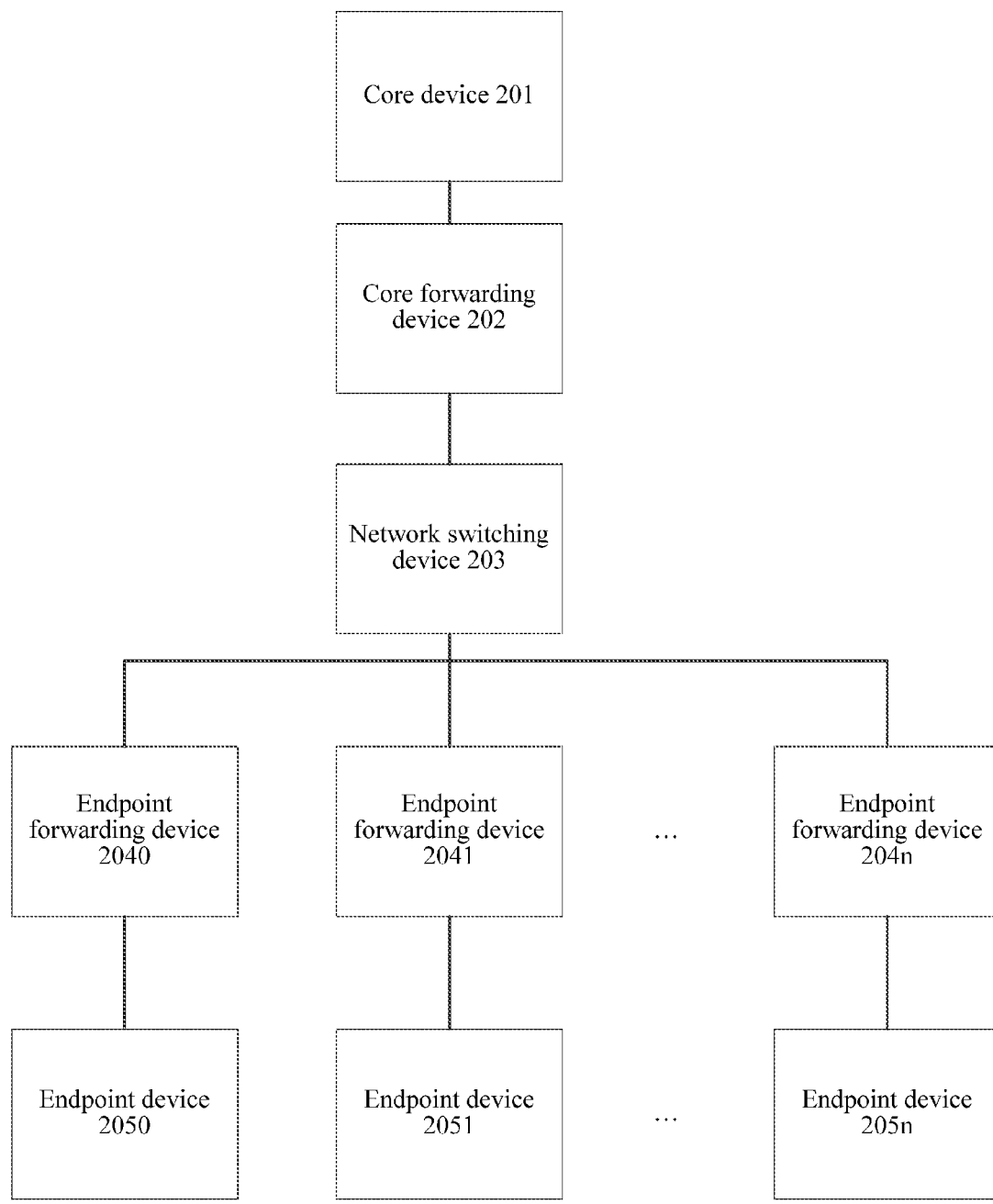
FIG. 2 is a schematic diagram of a system according to an embodiment of the present disclosure.

Referring to FIG. 2, FIG. 2 is a schematic diagram of a system according to an embodiment of the present disclosure. As shown in FIG. 2, the system includes a core device 201, a core forwarding device 202, a network switching device 203, at least two endpoint forwarding devices, where the at least two endpoint forwarding device may be numbered from 2040 to 204n (where n is a positive integer), and at least two endpoint devices, where the at least endpoint devices may be numbered from 2050 to 205n. PCIe links exist between the core device and the core forwarding device and between an endpoint device and an endpoint forwarding device, and an Ethernet link exists between the core forwarding device and an endpoint forwarding device.

In the following, details are described using an example in which the core device 201 sends a first PCIe packet to the endpoint device 2050.

Further referring to FIG. 2, in this embodiment, a PCIe processing module (not shown) in the core device 201 allocates a first traffic class to a first PCIe packet according to a destination-end device to which the first PCIe packet is sent, for example, the destination-end device may be the endpoint device 2050, the endpoint device 2051, or the like, and further the allocation may be performed using a completer identifier or an access address of the first PCIe packet, where the first traffic class is in a one-to-one correspondence with the destination-end device, to send the first PCIe packet to the core forwarding device 202 through a first virtual channel that is in a one-to-one correspondence with the first traffic class and is in a PCIe channel.

In an actual application, the PCIe bus protocol stipulates eight transmission types, which are separately TC0 to TC7, a PCIe device may set a quantity of supported virtual channels using software, and the virtual channels may are in one-to-one correspondences with VC0 to VC7. Certainly, if the quantity of transmission types that are stipulated by the PCIe bus protocol do not satisfy a need, by means of description in this embodiment, a person skilled in this art can modify the PCIe bus protocol, or define a new protocol or transmission rule that satisfies a requirement on PCIe packet transmission. Details are not described herein again.

After the core device 201 sends the first PCIe packet to the core forwarding device 202 through the first virtual channel that is in a one-to-one correspondence with the first traffic class and is in the PCIe channel, the core forwarding device 202 can receive, through the first virtual channel, the first PCIe packet sent by the core device 201.

Figure 3:
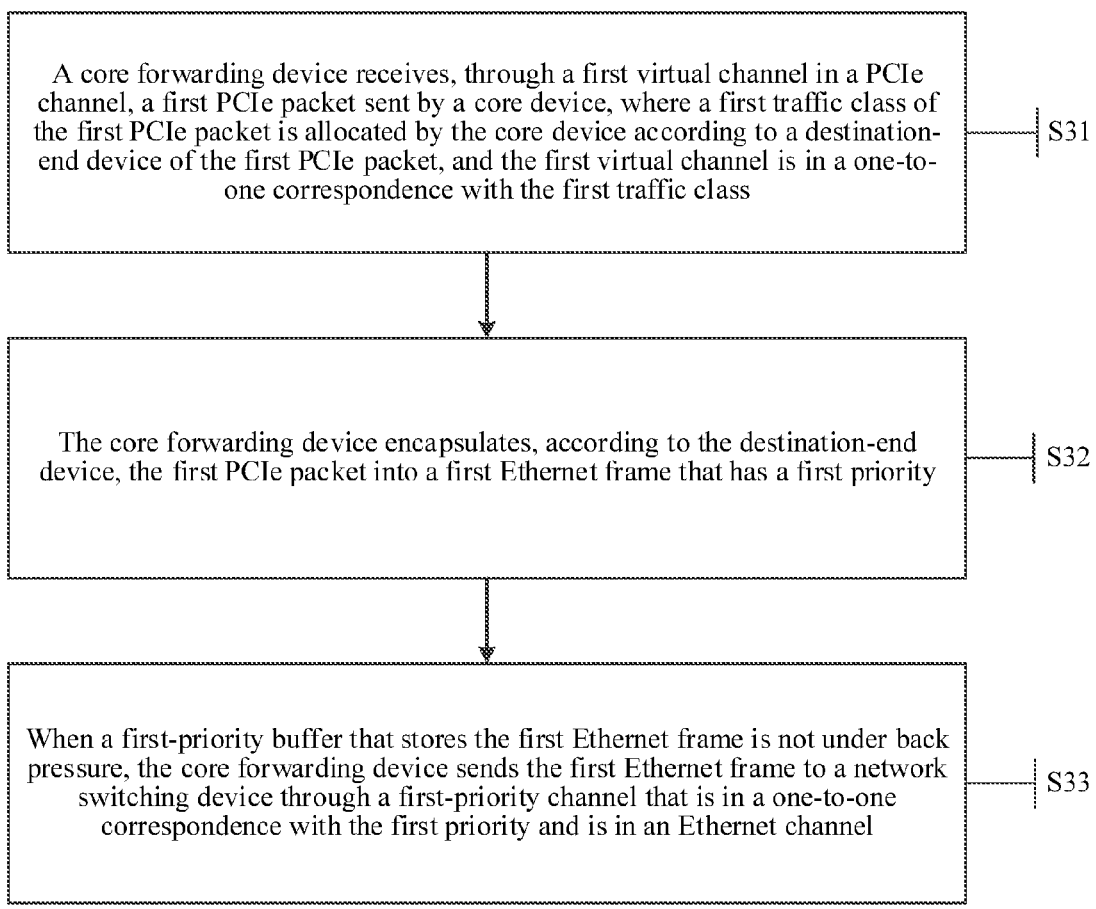
FIG. 3 is a flowchart of a data transmission method according to an embodiment of the present disclosure.

Referring to FIG. 3, FIG. 3 is a flowchart of a data transmission method according to an embodiment of the present disclosure. The data transmission method may be applied to the core forwarding device 202 in the system provided by the embodiment of the present disclosure. As shown in FIG. 3, the method includes the following steps.

Step S31: A core forwarding device receives, through a first virtual channel in a PCIe channel, a first PCIe packet sent by a core device, where a first traffic class of the first PCIe packet is allocated by the core device according to a destination-end device of the first PCIe packet, and the first virtual channel is in a one-to-one correspondence with the first traffic class.

In a specific implementation process, after receiving, through the first virtual channel in the PCIe channel, the first PCIe packet sent by the core device 201, the core forwarding device 202 may put the first PCIe packet into a PCIe receiving buffer of the core forwarding device 202, and then put the first PCIe packet into a sending buffer of the core forwarding device 202 according to the destination-end device of the first PCIe packet.

Certainly, in an actual application, the sending buffer of the core forwarding device 202 may also be correspondingly divided into a first sending buffer, a second sending buffer, and the like according to destination-end devices of PCIe packets, and then the first PCIe packet in the PCIe receiving buffer may be put into the corresponding first sending buffer according to the destination-end device of the first PCIe packet, to facilitate subsequent processing, which is not limited herein.

Step S32: The core forwarding device encapsulates, according to the destination-end device, the first PCIe packet into a first Ethernet frame that has a first priority. By means of description in this embodiment, a person skilled in the art can understand a specific process of encapsulating the first PCIe packet into the first Ethernet frame that has the first priority. Details are not described herein again.

In a specific implementation process, after encapsulating the first PCIe packet into the first Ethernet frame that has the first priority, the core forwarding device 202 may put the first Ethernet frame into a first-priority buffer corresponding to the first priority.

Step S33: When a first-priority buffer that stores the first Ethernet frame is not under back pressure, the core forwarding device sends the first Ethernet frame to a network switching device through a first-priority channel that is in a one-to-one correspondence with the first priority and is in an Ethernet channel.

In a specific implementation process, referring to FIG. 2, a data buffer capability of the network switching device 203 is relatively strong, while a data buffer capability of a device such as the endpoint forwarding device 2040, the endpoint forwarding device 2041, the endpoint device 2050, or the endpoint device 2051 is relatively weak. Therefore, if a data amount of a PCIe packet sent by the core forwarding device 202 to these devices exceeds data buffer capabilities of these devices, these devices exert back pressure on the first-priority buffer of the core forwarding device 202, and the core forwarding device 202 stops sending or delays sending an Ethernet frame stored in the first-priority buffer.

That is, when the core forwarding device 202 does not need to stop sending or delay sending the first Ethernet frame stored in the first-priority buffer, the core forwarding device 202 may send the first Ethernet frame stored in the first-priority buffer to the network switching device 203 through the first-priority channel that is in a one-to-one correspondence with the first priority and is in the Ethernet channel.

It should be noted that, when encapsulating the first PCIe packet into the first Ethernet frame that has the first priority, the core forwarding device 202 additionally encapsulates hardware addresses (that is, media access control (MAC) addresses) of two ends of the first-priority channel corresponding to the first priority, that is, a hardware address from which the core forwarding device 202 sends the first Ethernet frame, and a hardware address of the network switching device 203 into the first Ethernet frame such that the core forwarding device 202 can correctly send the first Ethernet frame from the first-priority buffer to the network switching device 203. Details are not described herein again.

After the core forwarding device 202 sends the first Ethernet frame to the network switching device through the first-priority channel that is in a one-to-one correspondence with the first priority and is in the Ethernet channel, the network switching device 203 can send the first Ethernet frame to the endpoint forwarding device 2040 through the first-priority channel. It should be noted that, the network switching device in this embodiment may be a switch that supports the priority-based flow control (PFC) protocol, where the switch may send an Ethernet frame according to a priority of the Ethernet frame through channels that have different priorities.

After the network switching device 203 sends the first Ethernet frame to the endpoint forwarding device 2040 through the first-priority channel, the endpoint forwarding device 2040 can receive the first Ethernet frame through the first-priority channel.

Figure 4:
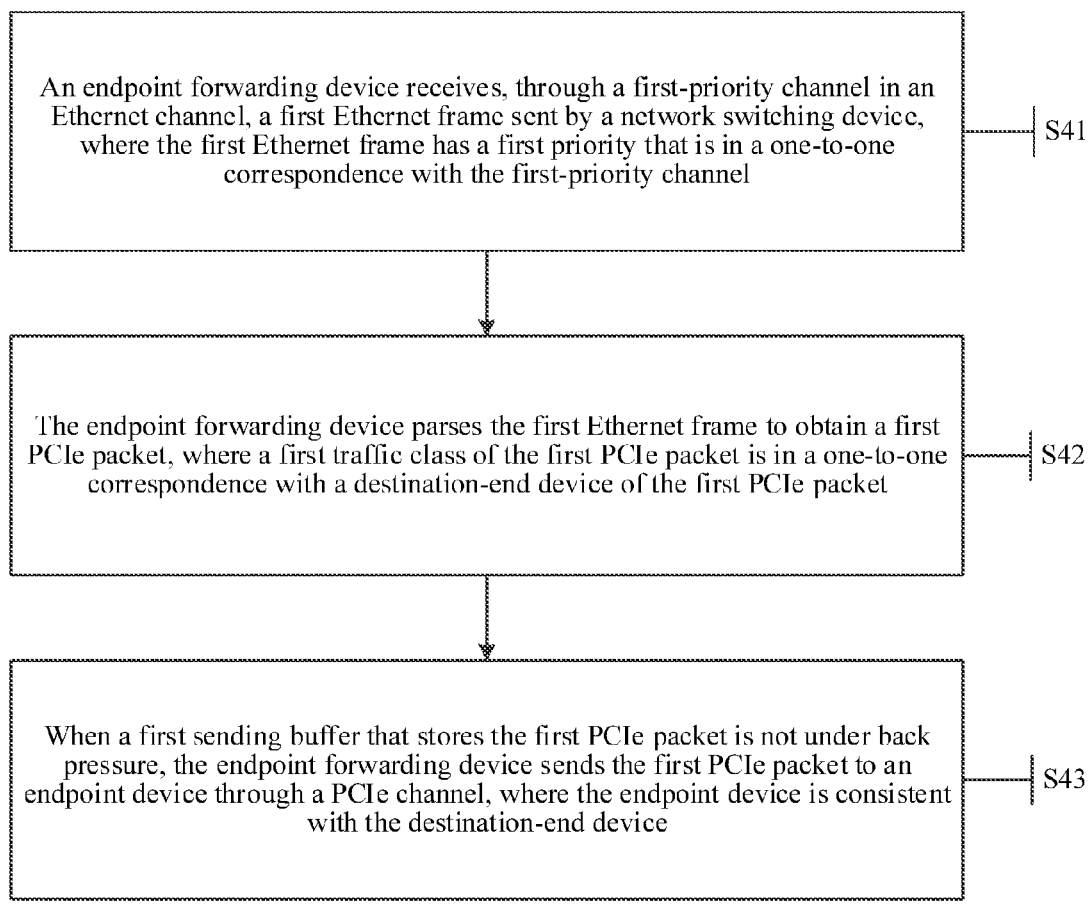
FIG. 4 is a flowchart of a data transmission method according to an embodiment of the present disclosure.

Referring to FIG. 4, FIG. 4 is a flowchart of a data transmission method according to an embodiment of the present disclosure. The data transmission method may be applied to the endpoint forwarding device 2040 in the system provided by the embodiment of the present disclosure. As shown in FIG. 4, the method includes the following steps.

Step S41: An endpoint forwarding device receives, through a first-priority channel in an Ethernet channel, a first Ethernet frame sent by a network switching device, where the first Ethernet frame has a first priority that is in a one-to-one correspondence with the first-priority channel.

Step S42: The endpoint forwarding device parses the first Ethernet frame to obtain a first PCIe packet, where a first traffic class of the first PCIe packet is in a one-to-one correspondence with a destination-end device of the first PCIe packet. By means of description in this embodiment, a person skilled in the art can understand a specific process of parsing the first Ethernet frame to obtain the first PCIe packet. Details are not described herein again.

In a specific implementation process, after parsing the first Ethernet frame to obtain the first PCIe packet, the endpoint forwarding device 2040 may put the first PCIe packet into a first sending buffer of the endpoint forwarding device 2040.

Step S43: When a first sending buffer that stores the first PCIe packet is not under back pressure, the endpoint forwarding device sends the first PCIe packet to an endpoint device through a PCIe channel, where the endpoint device is consistent with the destination-end device.

In a specific implementation process, it may be that the endpoint forwarding device 2040 moves the first PCIe packet from the first sending buffer into a PCIe sending buffer of the endpoint forwarding device 2040 such that the first PCIe packet is sent to the endpoint device 2050 through the PCIe channel. Details are not described herein again.

After the endpoint forwarding device 2040 sends the first PCIe packet to the endpoint device 2050 through the PCIe channel, the endpoint device 2050 can receive the first PCIe packet, thereby implementing that the core device 201 sends the first PCIe packet to the endpoint device 2050.

After a specific process in which the core device 201 sends the first PCIe packet to the endpoint device 2050 is introduced, in the following, a specific process in which the endpoint device 2050 sends a second PCIe packet to the core device 201 is introduced.

Further referring to FIG. 2, the endpoint device 2050 may allocate a second traffic class to the second PCIe packet according to an address of the endpoint device 2050, that is, a source-end device of the second PCIe packet. After sending the second PCIe packet to the endpoint forwarding device 2040 through the PCIe channel, the endpoint forwarding device 2040 can receive the second PCIe packet through the PCIe channel.

Figure 5:
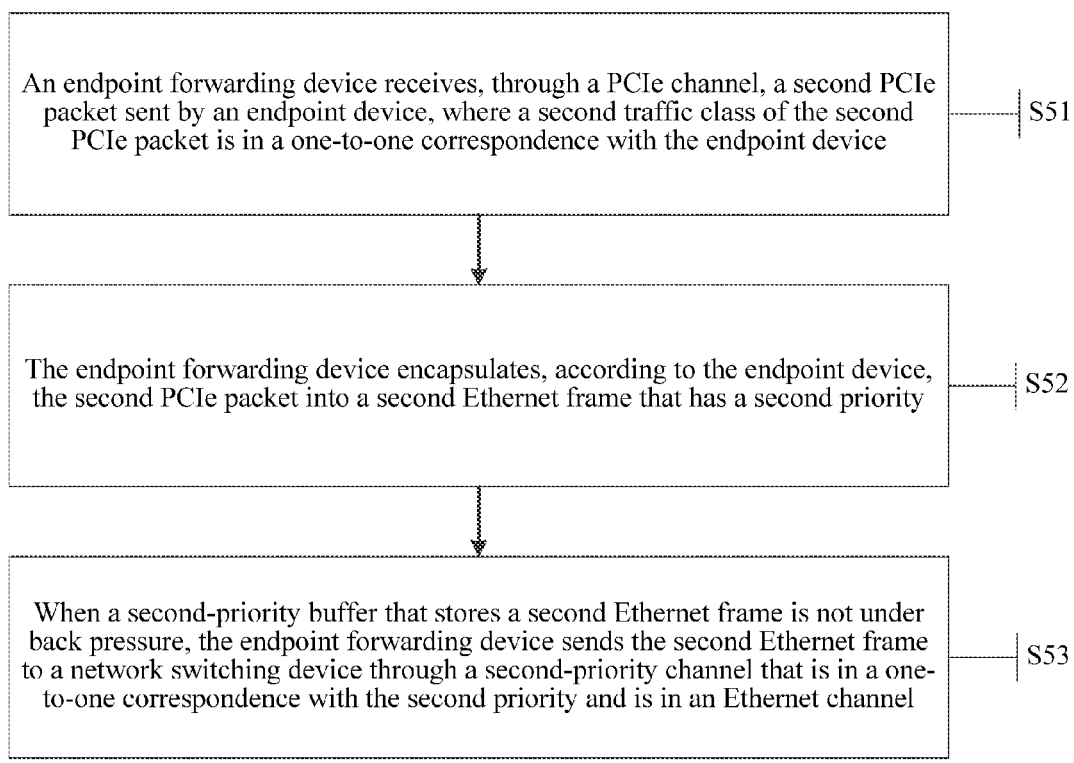
FIG. 5 is a flowchart of a data transmission method according to an embodiment of the present disclosure.

After the endpoint forwarding device 2040 receives the second PCIe packet through the PCIe channel, referring to FIG. 5, FIG. 5 is a flowchart of a data transmission method according to an embodiment of the present disclosure. The data transmission method may be applied to the endpoint forwarding device 2040 provided by the embodiment of the present disclosure. As shown in FIG. 5, the method includes the following steps.

Step S51: An endpoint forwarding device receives, through a PCIe channel, a second PCIe packet sent by an endpoint device, where a second traffic class of the second PCIe packet is in a one-to-one correspondence with the endpoint device.

Step S52: The endpoint forwarding device encapsulates, according to the endpoint device, the second PCIe packet into a second Ethernet frame that has a second priority.

Step S53: When a second-priority buffer that stores the second Ethernet frame is not under back pressure, the endpoint forwarding device sends the second Ethernet frame to a network switching device through a second-priority channel that is in a one-to-one correspondence with the second priority and is in an Ethernet channel.

After the endpoint forwarding device 2040 sends the second Ethernet frame to the network switching device 203 through the second-priority channel that is in a one-to-one correspondence with the second priority and is in the Ethernet channel, the network switching device 203 can send the second Ethernet frame to the core forwarding device 202 through the second-priority channel.

After the network switching device 203 sends the second Ethernet frame to the core forwarding device 202 through the second-priority channel, the core forwarding device 202 can receive the second Ethernet frame.

Figure 6:
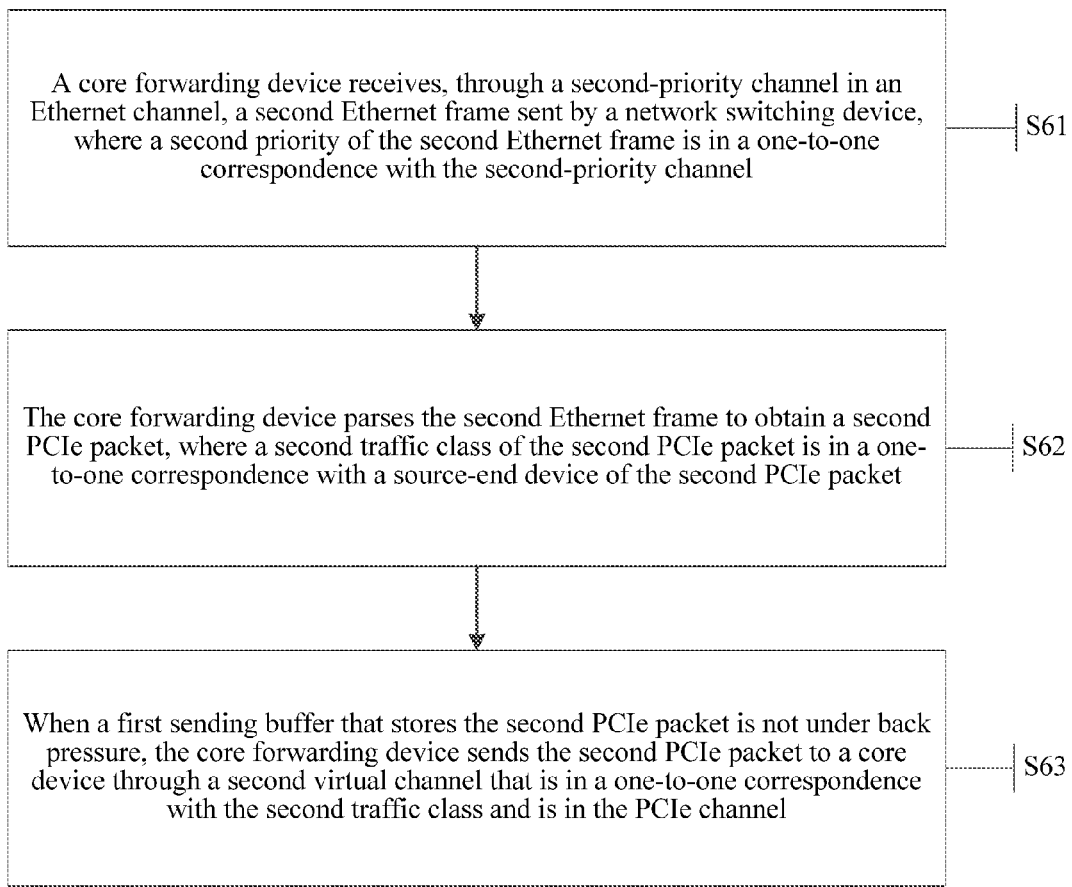
FIG. 6 is a flowchart of a data transmission method according to an embodiment of the present disclosure.

Referring to FIG. 6, FIG. 6 is a flowchart of a data transmission method according to an embodiment of the present disclosure. The data transmission method may be applied to the core forwarding device 202 in the system provided by the embodiment of the present disclosure. As shown in FIG. 6, the method includes the following steps.

Step S61: A core forwarding device receives, through a second-priority channel in an Ethernet channel, a second Ethernet frame sent by a network switching device, where a second priority of the second Ethernet frame is in a one-to-one correspondence with the second-priority channel.

Step S62: The core forwarding device parses the second Ethernet frame to obtain a second PCIe packet, where a second traffic class of the second PCIe packet is in a one-to-one correspondence with a source-end device of the second PCIe packet.

Step S63: When a first sending buffer that stores the second PCIe packet is not under back pressure, the core forwarding device sends the second PCIe packet to a core device through a second virtual channel that is in a one-to-one correspondence with the second traffic class and is in the PCIe channel.

After the core forwarding device 202 sends the second PCIe packet to the core device 201 through the second virtual channel, the core device 201 can receive the second PCIe packet, and can determine, according to the second traffic class of the second PCIe packet, a specific endpoint device that sends the second PCIe packet. In this embodiment, the endpoint device 2050 allocates the second traffic class to the second PCIe packet according to an address of the endpoint device 2050. Therefore, the core device 201 can determine, using the second traffic class of the second PCIe packet, that the second PCIe packet is sent by the endpoint device 2050.

It can be seen from the foregoing that, a core forwarding device is adopted to receive, through a first virtual channel that is in a one-to-one correspondence with a first traffic class of a first PCIe packet and is in a PCIe channel, the first PCIe packet sent by a core device, where the first traffic class is allocated by the core device according to a destination-end device of the first PCIe packet, where the first traffic class is in a one-to-one correspondence with the destination-end device, and the first virtual channel is in a one-to-one correspondence with the first traffic class, encapsulate, according to the destination-end device of the first PCIe packet, the first PCIe packet into a first Ethernet frame that has a first priority, send the first Ethernet frame to a network switching device through a first-priority channel that is in a one-to-one correspondence with the first priority and is in an Ethernet channel, receive, through a second-priority channel that is in a one-to-one correspondence with a second priority of a second Ethernet frame and is in the Ethernet channel, the second Ethernet frame sent by the network switching device, parse the second Ethernet frame to obtain a second PCIe packet, where a second traffic class of the second PCIe packet is in a one-to-one correspondence with a source-end device of the second PCIe packet, and send the second PCIe packet to the core device through a second virtual channel that is in a one-to-one correspondence with the second traffic class and is in the PCIe channel. In this way, an end-to-end flow control technology based on a traffic class (where this traffic class is allocated according to different endpoint devices) is applied between the core device and the endpoint device (that is, the source-end device of the second PCIe packet). A data transmission channel between the core device and an endpoint device and a data transmission channel between the core device and another endpoint device do not affect each other. Therefore, a technical problem in the prior art that a uniform back pressure is generated in an entire data transmission link if any endpoint device generates back pressure when PCIe data is transmitted through the Ethernet is resolved, thereby achieving technical effects of increasing bandwidth utilization of the entire system and increasing the data transmission efficiency.

Figure 7:
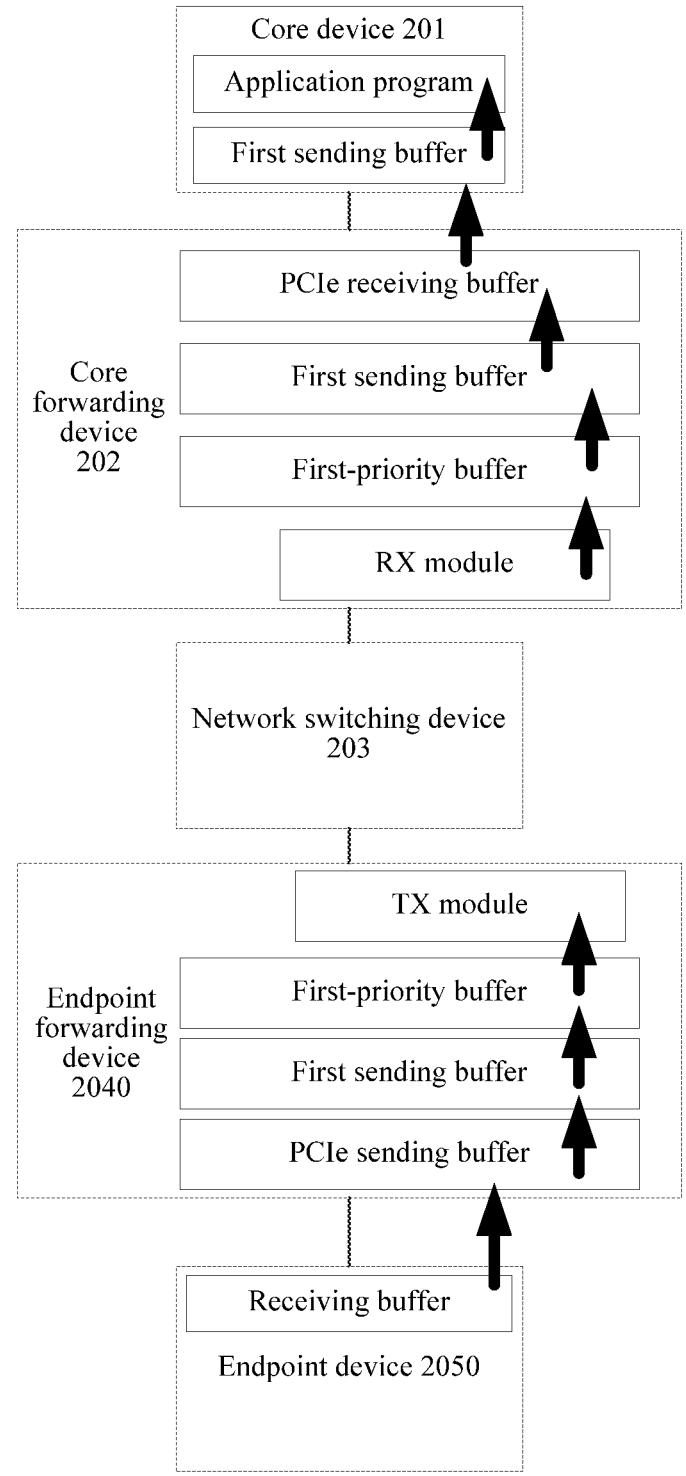
FIG. 7 is a schematic diagram of transmission of a back pressure signal according to an embodiment of the present disclosure.

In the following, a specific process in which a back pressure signal is sent from the endpoint device to the core device in the systems provided by the embodiments of the present disclosure is introduced using the endpoint device 2050 as an example. Referring to FIG. 7, FIG. 7 is a schematic diagram of transmission of a back pressure signal according to an embodiment of the present disclosure. Arrows in the figure represent a process of performing back pressure level by level. As shown in FIG. 7, the process is as follows.

Step 1: After the endpoint forwarding device 2040 sends a PCIe packet to the endpoint device 2050, if a data buffer capability of the endpoint device 2050 cannot satisfy a data amount of the PCIe packet sent by the endpoint forwarding device 2040, a first back pressure signal is generated in a PCIe receiving buffer of the endpoint device 2050, and the back pressure signal is transmitted to a PCIe sending buffer in the endpoint forwarding device 2040 using a credit value of a PCIe channel.

Step 2: The PCIe sending buffer of the endpoint forwarding device 2040 receives the first back pressure signal through the PCIe channel, and after receiving the first back pressure signal, the PCIe sending buffer exerts back pressure on a first sending buffer.

Step 3: The first sending buffer of the endpoint forwarding device 2040 exerts back pressure on a first-priority buffer in an Ethernet processing module, and a TX module (which is an uplink module) in the Ethernet processing module sends a PFC frame (that is, a second back pressure signal) to the network switching device 203, that is, transmits the second back pressure signal to the core forwarding device 202 through a first-priority channel.

It should be noted that, it is not that the endpoint forwarding device 2040 can exert back pressure on the core forwarding device 202 only according to the first back pressure signal sent by the endpoint device 2050, and when a data capacity of the PCIe sending buffer, the first sending buffer, or the first-priority buffer in the endpoint forwarding device 2040 exceeds a preset threshold, the endpoint forwarding device 2040 also generates a back pressure signal and sends the back pressure signal to the core forwarding device 202, to exert back pressure on the core forwarding device 202.

Step 4: After the core forwarding device 202 sends an Ethernet frame to the network switching device 203, the network switching device 203 further sends the Ethernet frame to the endpoint forwarding device 2040, and the endpoint forwarding device 2040 furthers converts the Ethernet frame into an PCIe packet and sends the PCIe packet to the endpoint device 2050. If the endpoint device 2050 or the endpoint forwarding device 2040 generates a back pressure signal and sends the back pressure signal to the core forwarding device 202 using a transmitter (TX) module (which is an uplink module) of the network switching device 203, after the core forwarding device 202 receives a third back pressure signal (that is, the PFC frame or the second back pressure signal sent by the endpoint forwarding device 2040) using an receiver (RX) module (which is a downlink module), the first-priority buffer exerts back pressure on a first sending buffer of the core forwarding device 202, where a traffic class of a PCIe packet stored in the first sending buffer is a first traffic class, that is, a destination-end device of the PCIe packet stored in the first sending buffer is the endpoint device 2050.

Step 5: The first sending buffer of the core forwarding device 202 generates a fourth back pressure signal, and sends the fourth back pressure signal to a receiving buffer of a first virtual channel of the PCIe channel.

Step 6: The core forwarding device 202 exerts back pressure on a first sending buffer of a PCIe channel of the core device 201 using a credit mechanism of the first virtual channel.

Step 7: The first sending buffer of the core device 201 exerts back pressure on an application program of the endpoint device 2050, to make the application program pause a related service.

Step 8: Finally, pause a PCIe packet to be sent by the core device to 2050.

Certainly, a specific process in which a back pressure signal is sent from the core device to an endpoint device is similar to the foregoing process. Details are not described herein again.

It can be seen from the foregoing that, when the endpoint device 2050 exerts back pressure, in an entire data transmission link, back pressure is exerted on only a link related to the endpoint device 2050, while a link related to another endpoint device is not affected, thereby achieving technical effects of increasing bandwidth utilization of the system and increasing the data transmission efficiency.

Further, in step 2, when back pressure is exerted on the PCIe receiving buffer of the endpoint forwarding device 2040 by the receiving buffer of the endpoint device 2050, the PCIe receiving buffer of the endpoint forwarding device 2040 may temporarily not generate a back pressure signal and send the back pressure signal to a receiving buffer of the Ethernet processing module, but send the back pressure signal to the receiving buffer of the Ethernet processing module only when the PCIe receiving buffer reaches a first threshold. In this case, the PCIe channel may continue to be used, thereby increasing PCIe utilization of bandwidth between the endpoint device 2050 and the endpoint forwarding device 2040.

Similarly, in step 5, when back pressure is exerted on the first sending buffer of the core forwarding device 202 by the first-priority buffer of the core forwarding device 202, the first sending buffer temporarily does not exert back pressure on the receiving buffer of the first virtual channel of the PCIe channel, and exert back pressure on the receiving buffer of the first virtual channel of the PCIe channel only when the first sending buffer reaches the first threshold. In this case, the PCIe channel may continue to be used, thereby increasing PCIe bandwidth utilization between the core forwarding device 202 and the core device 201.

In an actual application, it is defined in the unmodified PCIe protocol that a specified packet needs to be transmitted through a specified virtual channel in the PCIe channel if the PCIe channel uses an unmodified PCIe bus transmission protocol. For example, packets such as a configuration packet, a power management message packet, an error signaling message packet, and a release locking message packet must be transmitted through VC0. Examples are not enumerated herein. Such a packet occupies very low bandwidth, having a relatively small effect on the system and the data transmission method provided by the embodiments of the present disclosure.

To reduce an effect of the specified packet on PCIe bandwidth, an effect of such a packet on the PCIe bandwidth may be reduced in a manner of two-level back pressure. Furthermore, an example in which a PCIe packet sent to the endpoint device 2050 is transmitted through VC0 is used, when back pressure is exerted on the first sending buffer (where the PCIe packet sent to the endpoint device 2050 is stored in the first sending buffer) of the core forwarding device 202, the first sending buffer exerts back pressure on the receiving buffer of the first virtual channel of the PCIe channel when reaching the first threshold, while a second sending buffer, a third sending buffer, or the like that stores a PCIe packet of another endpoint device such as 2051 or 2052 may exert back pressure on a receiving buffer of a second virtual channel or a third virtual channel of the PCIe channel when reaching the first threshold, and exert back pressure on a first PCIe sending buffer in the core device when reaching a second threshold that is greater than the first threshold, that is, exert back pressure on VC0.

Figure 8:
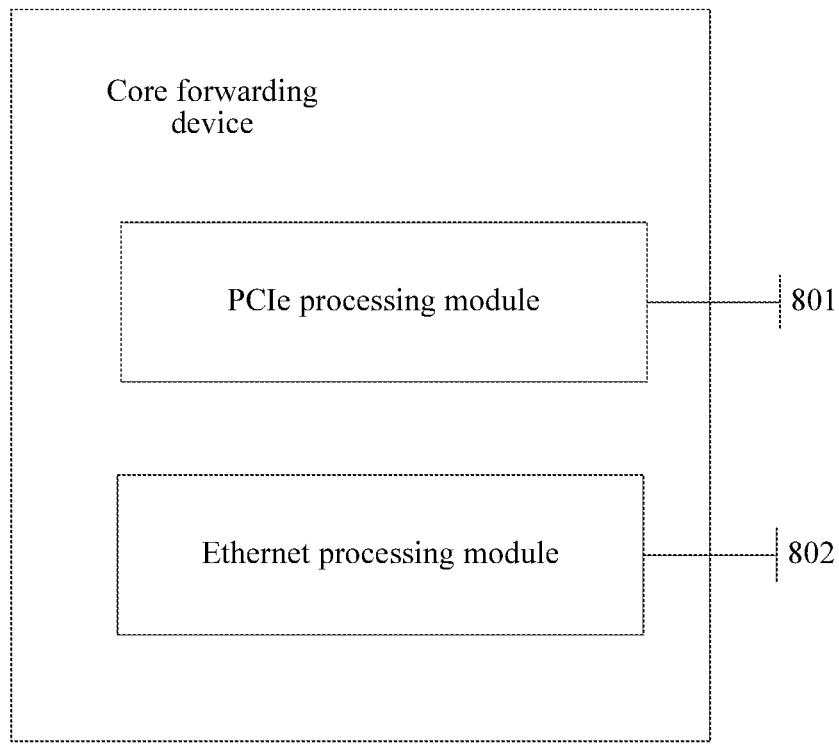
FIG. 8 is a diagram of a functional module of a core forwarding device according to an embodiment of the present disclosure.

Based on the same disclosure conception, an embodiment of the present disclosure further provides a core forwarding device. Referring to FIG. 8, FIG. 8 is a diagram of a functional module of a core forwarding device according to an embodiment of the present disclosure. As shown in FIG. 8, the core forwarding device includes a PCIe processing module 801 configured to receive, through a first virtual channel in a PCIe channel, a first PCIe packet sent by a core device, where a first traffic class of the first PCIe packet is allocated by the core device according to a destination-end device of the first PCIe packet, where the first traffic class is in a one-to-one correspondence with the destination-end device, and the first virtual channel is in a one-to-one correspondence with the first traffic class, and an Ethernet processing module 802 configured to encapsulate, according to the destination-end device, the first PCIe packet into a first Ethernet frame that has a first priority, and send the first Ethernet frame to a network switching device through a first-priority channel that is in a one-to-one correspondence with the first priority and is in an Ethernet channel when a first-priority buffer that stores the first Ethernet frame is not under back pressure, where the Ethernet processing module 802 is further configured to receive, through a second-priority channel in the Ethernet channel, a second Ethernet frame sent by the network switching device, where a second priority of the second Ethernet frame is in a one-to-one correspondence with the second-priority channel, and parse the second Ethernet frame to obtain a second PCIe packet, where a second traffic class of the second PCIe packet is in a one-to-one correspondence with a source-end device of the second PCIe packet, and the PCIe processing module 801 is further configured to send the second PCIe packet to the core device through a second virtual channel that is in a one-to-one correspondence with the second traffic class and is in the PCIe channel when a first sending buffer that stores the second PCIe packet is not under back pressure.

In this embodiment of the present disclosure, the Ethernet processing module 802 is further configured to receive, through the first-priority channel, a first back pressure signal sent by the network switching device, and stop, according to the first back pressure signal, sending the first PCIe packet to the network switching device through the first-priority channel, and the PCIe processing module 801 is further configured to generate a second back pressure signal according to the first back pressure signal, and send the second back pressure signal to the core device through the first virtual channel, and the PCIe processing module 801 is further configured to receive, through the second virtual channel, a third back pressure signal sent by the core device, and stop, according to the third back pressure signal, sending the second PCIe packet to the core device through the second virtual channel, and the PCIe processing module 801 is further configured to generate a fourth back pressure signal according to the third back pressure signal, and send the fourth back pressure signal to the network switching device through the second-priority channel.

In this embodiment of the present disclosure, a sending buffer of the core forwarding device includes a first-type sending buffer and a second-type sending buffer, where the first-type sending buffer is a buffer that is in a one-to-one correspondence with a specified virtual channel when the core forwarding device receives a specified packet through the specified virtual channel in the PCIe channel, and the second-type sending buffer is another buffer, other than the first-type sending buffer, in the sending buffer of the core forwarding device, and the PCIe processing module 801 is further configured to generate the second back pressure signal when the first back pressure signal is to exert back pressure on the first-type sending buffer, and when a volume of data stored in the first-type sending buffer exceeds a first threshold, or generate the second back pressure signal when the first back pressure signal is to exert back pressure on the second-type sending buffer, and when a volume of data stored in the second-type sending buffer exceeds the first threshold.

In this embodiment of the present disclosure, the PCIe processing module 801 is further configured to generate a specified back pressure signal when the capacity of the data stored in the second-type sending buffer exceeds a second threshold, to exert back pressure on a first PCIe sending buffer in the core device after the second back pressure signal is generated when the first back pressure signal is to exert back pressure on the second-type sending buffer, and when the capacity of the data stored in the second-type sending buffer exceeds the first threshold where the second threshold is greater than the first threshold.

The core forwarding device in this embodiment of the present disclosure, and the data transmission method that is in the previous embodiments and that is applied to the core forwarding device in the system provided by the embodiment of the present disclosure are two aspects that are based on the same disclosure conception. The foregoing already describes the implementation processes of the method in detail. Therefore, a person skilled in the art can clearly understand structures and implementation processes of electronic devices in this embodiment according to the foregoing description. For conciseness of this specification, details are not described herein again.

Figure 9:
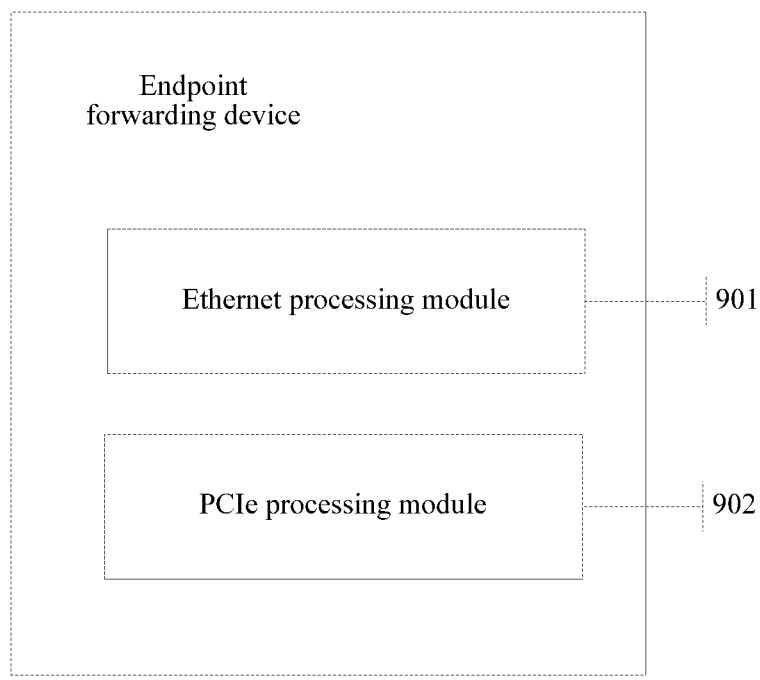
FIG. 9 is a diagram of a functional module of an endpoint forwarding device according to an embodiment of the present disclosure.

Based on the same disclosure conception, an embodiment of the present disclosure further provides an endpoint forwarding device. Referring to FIG. 9, FIG. 9 is a diagram of a functional module of an endpoint forwarding device according to an embodiment of the present disclosure. As shown in FIG. 9, the endpoint forwarding device includes an Ethernet processing module 901 configured to receive, through a first-priority channel in an Ethernet channel, a first Ethernet frame sent by a network switching device, where the first Ethernet frame has a first priority that is in a one-to-one correspondence with the first-priority channel, and parse the first Ethernet frame to obtain a first PCIe packet, where a first traffic class of the first PCIe packet is in a one-to-one correspondence with a destination-end device of the first PCIe packet, and a PCIe processing module 902 configured to send the first PCIe packet to an endpoint device through a PCIe channel when a first sending buffer that stores the first PCIe packet is not under back pressure, where the endpoint device is consistent with the destination-end device, where the PCIe processing module 902 is configured to receive, through the PCIe channel, a second PCIe packet sent by the endpoint device, where a second traffic class of the second PCIe packet is in a one-to-one correspondence with the endpoint device, and the Ethernet processing module 901 is configured to encapsulate, according to the endpoint device, the second PCIe packet into a second Ethernet frame that has a second priority, and when send the second Ethernet frame to the network switching device through a second-priority channel that is in a one-to-one correspondence with the second priority and is in the Ethernet channel a second-priority buffer that stores the second Ethernet frame is not under back pressure.

In this embodiment of the present disclosure, the PCIe processing module 902 is configured to receive, through the PCIe channel, a first back pressure signal sent by the endpoint device, and stop sending the first PCIe packet to the endpoint device through the PCIe channel. The Ethernet processing module 901 is configured to generate a second back pressure signal according to the first back pressure signal, and send the second back pressure signal to the network switching device through the first-priority channel, and the Ethernet processing module 901 is configured to stop sending the second Ethernet frame to the network switching device through the second-priority channel after receiving, through the second-priority channel, a third back pressure signal sent by the network switching device. The PCIe processing module 902 is configured to generate a fourth back pressure signal according to the third back pressure signal, and send the fourth back pressure signal to the endpoint device through the PCIe channel.

In this embodiment of the present disclosure, the PCIe processing module 902 is further configured to generate the fourth back pressure signal according to the third back pressure signal when a sending buffer of the endpoint forwarding device reaches a first threshold.

The endpoint forwarding device in this embodiment of the present disclosure, and the data transmission method that is in the previous embodiments and that is applied to the endpoint forwarding device in the system provided by the embodiment of the present disclosure are two aspects that are based on the same disclosure conception. The foregoing already describes the implementation processes of the method in detail. Therefore, a person skilled in the art can clearly understand, according to the foregoing description, structures and implementation processes of electronic devices in this embodiment. For conciseness of this specification, details are not described herein again.

Figure 10:
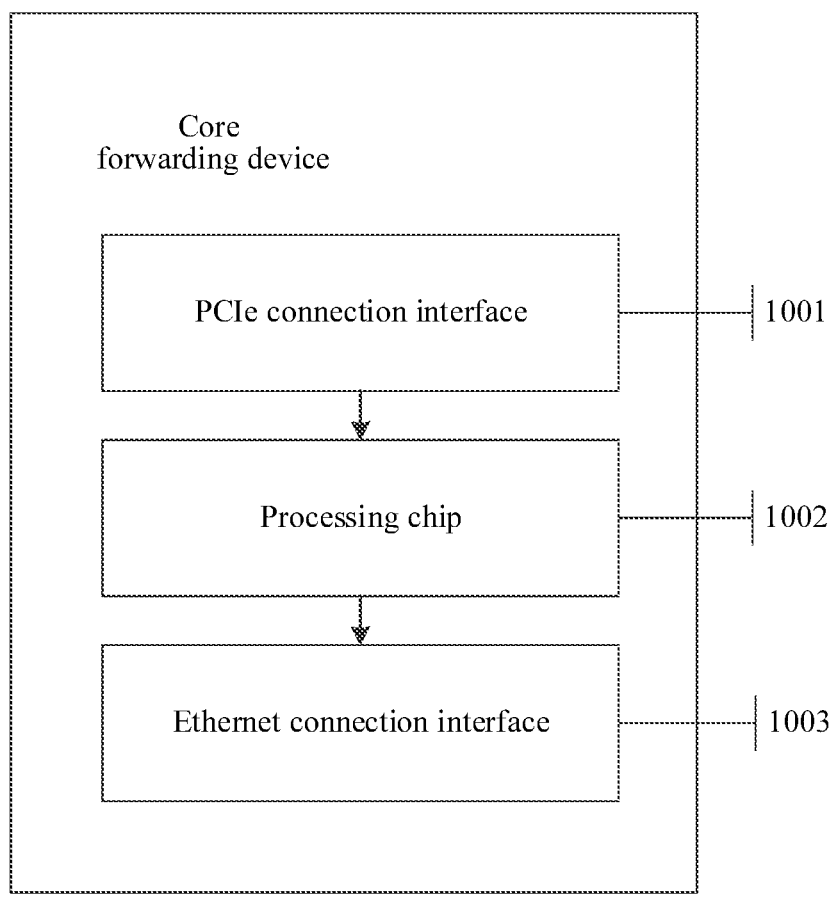
FIG. 10 is a schematic structural diagram of a core forwarding device according to an embodiment of the present disclosure.

Based on the same disclosure conception, an embodiment of the present disclosure further provides a core forwarding device. Referring to FIG. 10, FIG. 10 is a schematic structural diagram of a core forwarding device according to an embodiment of the present disclosure. As shown in FIG. 10, the core forwarding device includes a PCIe connection interface 1001, a processing chip 1002, and an Ethernet connection interface 1003, where the processing chip 1002 may be further a field-programmable gate array (FPGA), may be a complex programmable logic device (CPLD), or the like, which is not limited herein again.

The processing chip 1002 is separately connected to the PCIe connection interface 1001 and the Ethernet connection interface 1003, and is configured to receive, through a first virtual channel on the PCIe connection interface, a first PCIe packet sent by a core device, where a first traffic class of the first PCIe packet is allocated by the core device according to a destination-end device of the first PCIe packet, and the first virtual channel is in a one-to-one correspondence with the first traffic class, encapsulate, according to the destination-end device, the first PCIe packet into a first Ethernet frame that has a first priority, send the first Ethernet frame to a network switching device through a first-priority channel that is in a one-to-one correspondence with the first priority and is in the Ethernet connection interface when a first-priority buffer that stores the first Ethernet frame is not under back pressure, receive, through a second-priority channel in the Ethernet connection interface, a second Ethernet frame sent by the network switching device, where a second priority of the second Ethernet frame is in a one-to-one correspondence with the second-priority channel, parse the second Ethernet frame to obtain a second PCIe packet, where a second traffic class of the second PCIe packet is in a one-to-one correspondence with a source-end device of the second PCIe packet, and send the second PCIe packet to the core device through a second virtual channel that is in a one-to-one correspondence with the second traffic class and is in the PCIe connection interface when a first sending buffer that stores the second PCIe packet is not under back pressure.

Figure 11:
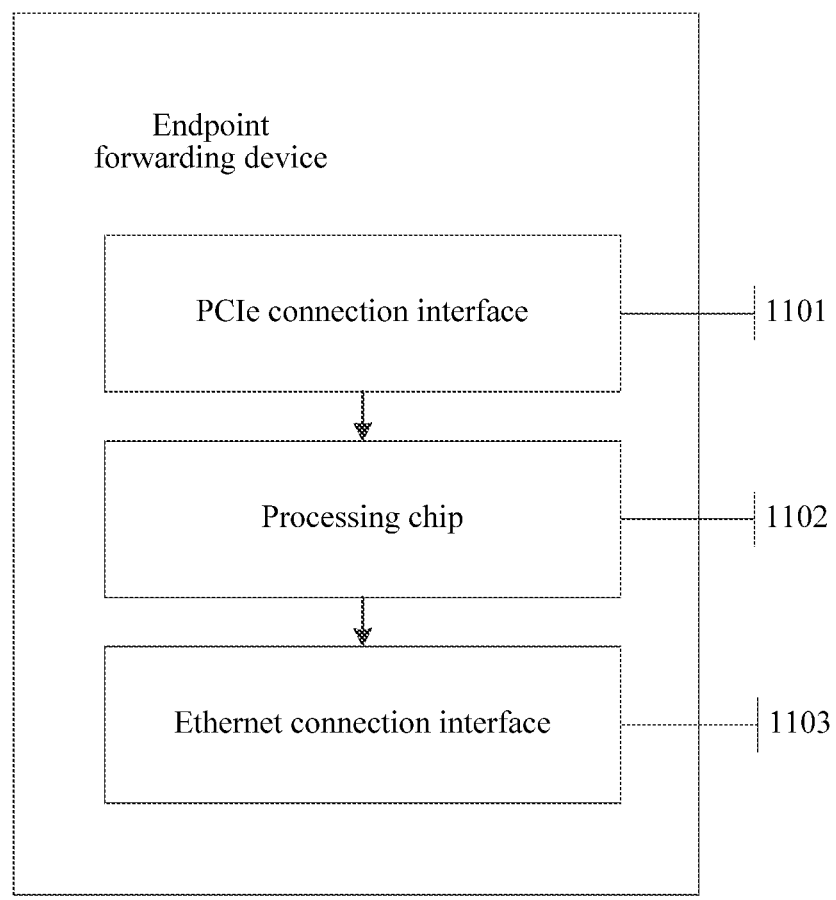
FIG. 11 is a schematic structural diagram of an endpoint forwarding device according to an embodiment of the present disclosure.

Based on the same disclosure conception, an embodiment of the present disclosure further provides an endpoint forwarding device. Referring to FIG. 11, FIG. 11 is a schematic structural diagram of an endpoint forwarding device according to an embodiment of the present disclosure. As shown in FIG. 11 the endpoint forwarding device includes a PCIe connection interface 1101, a processing chip 1102, and an Ethernet connection interface 1103, where the processing chip 1102 may be further an FPGA, may be a CPLD, or the like, which is not limited herein again.

The processing chip 1102 is configured to receive, through a first-priority channel in the Ethernet connection interface, a first Ethernet frame sent by a network switching device, where the first Ethernet frame has a first priority that is in a one-to-one correspondence with the first-priority channel, parse the first Ethernet frame to obtain a first PCIe packet, where a first traffic class of the first PCIe packet is in a one-to-one correspondence with a destination-end device of the first PCIe packet, send the first PCIe packet to an endpoint device through the PCIe connection interface, where the endpoint device is consistent with the destination-end device when a first sending buffer that stores the first PCIe packet is not under back pressure, receive, through the PCIe connection interface, a second PCIe packet sent by the endpoint device, where a second traffic class of the second PCIe packet is in a one-to-one correspondence with the endpoint device, encapsulate, according to the endpoint device, the second PCIe packet into a second Ethernet frame that has a second priority, and send the second Ethernet frame to the network switching device through a second-priority channel that is in a one-to-one correspondence with the second priority and is in the Ethernet connection interface when a second-priority buffer that stores the second Ethernet frame is not under back pressure.

It should be noted that, in this embodiment of the present disclosure, processing chips with same specification may be used as the processing chip 1002 of the core forwarding device and the processing chip 1102 of the endpoint forwarding device, program code that runs in the processing chip 1002 and the processing chip 1102 is adjusted such that the processing chip 1002 and the processing chip 1102 can implement respective functions, to satisfy a need of actual use. Certainly, the core forwarding device and the endpoint forwarding device may further include a component such as a buffer chip. Details are not described herein again.

The technical solutions in the embodiments of the present disclosure have at least the following technical effects or advantages.

1: A technical solution is adopted, in which a core forwarding device receives, through a first virtual channel that is in a one-to-one correspondence with a first traffic class of a first PCIe packet and is in a PCIe channel, the first PCIe packet sent by a core device, where the first traffic class is allocated by the core device according to a destination-end device of the first PCIe packet, where the first traffic class is in a one-to-one correspondence with the destination-end device, and the first virtual channel is in a one-to-one correspondence with the first traffic class, encapsulates, according to the destination-end device of the first PCIe packet, the first PCIe packet into a first Ethernet frame that has a first priority, sends the first Ethernet frame to a network switching device through a first-priority channel that is in a one-to-one correspondence with the first priority and is in an Ethernet channel, and receives, through a second-priority channel that is in a one-to-one correspondence with a second priority of a second Ethernet frame and is in the Ethernet channel, the second Ethernet frame sent by the network switching device, parses the second Ethernet frame to obtain a second PCIe packet, where a second traffic class of the second PCIe packet is in a one-to-one correspondence with a source-end device of the second PCIe packet, and sends the second PCIe packet to the core device through a second virtual channel that is in a one-to-one correspondence with the second traffic class and is in the PCIe channel such that an end-to-end flow control technology based on a traffic class (where this traffic class is allocated according to different endpoint devices) is formed between the core device and the endpoint device (that is, the source-end device of the second PCIe packet). A data transmission channel between the core device and an endpoint device and a data transmission channel between the core device and another endpoint device do not affect each other. Therefore, a technical problem in the prior art that a uniform back pressure is generated in an entire data transmission link if any endpoint device generates back pressure when PCIe data is transmitted through the Ethernet is resolved, thereby achieving technical effects of increasing bandwidth utilization of the entire system and increasing the data transmission efficiency.

2: A technical solution is adopted, in which when a first back pressure signal is to exert back pressure on a first-type sending buffer, and when a volume of data stored in the first-type sending buffer exceeds a first threshold, the core forwarding device generates a second back pressure signal, or when a first back pressure signal is to exert back pressure on a second-type sending buffer, and when a volume of data stored in the second-type sending buffer exceeds a first threshold, the core forwarding device generates a second back pressure signal such that the core forwarding device does not immediately generate the second back pressure signal when receiving the first back pressure signal, and generates the second back pressure signal only when the first-type sending buffer or the second-type sending buffer exceeds the first threshold, and in this case, the PCIe channel may continue to be used, thereby increasing PCIe bandwidth utilization.

3: A technical solution is adopted, in which when the capacity of the data stored in the second-type sending buffer exceeds a second threshold, the core forwarding device generates a specified back pressure signal, to exert back pressure on a first PCIe sending buffer in the core device, where the second threshold is greater than the first threshold. Therefore, an effect of a specified packet on PCIe bandwidth is reduced.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact-disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction device. The instruction device implements a specific function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A data transmission method, comprising:
receiving, by a core forwarding device through a first virtual channel in a peripheral component interconnect express (PCIe) channel, a first PCIe packet sent by a core device, wherein a first traffic class of the first PCIe packet is allocated by the core device according to a destination-end device of the first PCIe packet, wherein the first traffic class is in a one-to-one correspondence with the destination-end device, and wherein the first virtual channel is in a one-to-one correspondence with the first traffic class;
encapsulating, by the core forwarding device according to the destination-end device, the first PCIe packet into a first Ethernet frame that has a first priority;
sending, by the core forwarding device, the first Ethernet frame to a network switching device through a first-priority channel that is in a one-to-one correspondence with the first priority and is in an Ethernet channel, when a first-priority buffer that is configured to store the first Ethernet frame is not under back pressure;
receiving, by the core forwarding device through a second-priority channel in the Ethernet channel, a second Ethernet frame sent by the network switching device, wherein a second priority of the second Ethernet frame is in a one-to-one correspondence with the second-priority channel;
parsing, by the core forwarding device, the second Ethernet frame to obtain a second PCIe packet, wherein a second traffic class of the second PCIe packet is in a one-to-one correspondence with a source-end device of the second PCIe packet; and
sending, by the core forwarding device, the second PCIe packet to the core device through a second virtual channel that is in a one-to-one correspondence with the second traffic class and is in the PCIe channel, when a first sending buffer that is configured to store the second PCIe packet is not under back pressure.

2. The method according to claim 1, further comprising:
receiving, by the core forwarding device through the first-priority channel, a first back pressure signal sent by the network switching device after the first Ethernet frame is sent to the network switching device through the first-priority channel that is in the one-to-one correspondence with the first priority and is in the Ethernet channel;
stopping, by the core forwarding device according to the first back pressure signal, sending the first PCIe packet to the network switching device through the first-priority channel;
generating, by the core forwarding device, a second back pressure signal according to the first back pressure signal; and
sending the second back pressure signal to the core device through the first virtual channel.

3. The method according to claim 1, further comprising:
receiving, by the core forwarding device through the second virtual channel, a third back pressure signal sent by the core device, after the second PCIe packet is sent to the core device through the second virtual channel that is in the one-to-one correspondence with the second traffic class and is in the PCIe channel;

stopping, by the core forwarding device according to the third back pressure signal, sending the second PCIe packet to the core device through the second virtual channel;

generating, by the core forwarding device, a fourth back pressure signal according to the third back pressure signal; and sending the fourth back pressure signal to the network switching device through the second-priority channel.

4. The method according to claim 2, wherein a sending buffer of the core forwarding device comprises a first-type sending buffer and a second-type sending buffer, wherein the first-type sending buffer is a buffer that is in the one-to-one correspondence with a specified virtual channel when the core forwarding device receives a specified packet through the specified virtual channel in the PCIe channel, wherein the second-type sending buffer is another buffer, other than the first-type sending buffer, in the sending buffer of the core forwarding device, and wherein generating, by the core forwarding device, the second back pressure signal according to the first back pressure signal further comprises:

generating, by the core forwarding device, the second back pressure signal when the first back pressure signal is to exert back pressure on the first-type sending buffer and when a volume of data stored in the first-type sending buffer exceeds a first threshold; and generating, by the core forwarding device, the second back pressure signal when the first back pressure signal is to exert back pressure on the second-type sending buffer and when a volume of data stored in the second-type sending buffer exceeds the first threshold.

5. The method according to claim 4, wherein after generating, by the core forwarding device, the second back pressure signal when the first back pressure signal is to exert back pressure on the second-type sending buffer and when the volume of data stored in the second-type sending buffer exceeds the first threshold, the method further comprises generating, by the core forwarding device, a specified back pressure signal, to exert back pressure on a first PCIe sending buffer in the core device when the volume of the data stored in the second-type sending buffer exceeds a second threshold, wherein the second threshold is greater than the first threshold.

6. A data transmission method, comprising:

receiving, by an endpoint forwarding device through a first-priority channel in an Ethernet channel, a first Ethernet frame sent by a network switching device, wherein the first Ethernet frame has a first priority that is in a one-to-one correspondence with the first-priority channel;

parsing, by the endpoint forwarding device, the first Ethernet frame to obtain a first peripheral component interconnect express (PCIe) packet, wherein a first traffic class of the first PCIe packet is in a one-to-one correspondence with a destination-end device of the first PCIe packet;

sending, by the endpoint forwarding device, the first PCIe packet to an endpoint device through a PCIe channel, wherein the endpoint device is consistent with the destination-end device, when a first sending buffer that is configured to store the first PCIe packet is not under back pressure;

receiving, by the endpoint forwarding device through the PCIe channel, a second PCIe packet sent by the endpoint device, wherein a second traffic class of the second PCIe packet is in a one-to-one correspondence with the endpoint device;

encapsulating, by the endpoint forwarding device according to the endpoint device, the second PCIe packet into a second Ethernet frame that has a second priority; and sending, by the endpoint forwarding device, the second Ethernet frame to the network switching device through a second-priority channel that is in a one-to-one correspondence with the second priority and is in the Ethernet channel when a second-priority buffer that is configured to store the second Ethernet frame is not under back pressure.

7. The method according to claim 6, further comprising:

receiving, by the endpoint forwarding device through the PCIe channel, a first back pressure signal sent by the endpoint device, after the first PCIe packet is sent to the endpoint device through the PCIe channel;

stopping, by the endpoint forwarding device, sending the first PCIe packet to the endpoint device through the PCIe channel;

generating, by the endpoint forwarding device, a second back pressure signal according to the first back pressure signal;

sending the second back pressure signal to the network switching device through the first-priority channel;

receiving, by the endpoint forwarding device through the second-priority channel, a third back pressure signal sent by the network switching device, after the second Ethernet frame is sent to the network switching device through the second-priority channel that is in the one-to-one correspondence with the second priority and is in the Ethernet channel;

stopping sending the second Ethernet frame to the network switching device through the second-priority channel;

generating, by the endpoint forwarding device, a fourth back pressure signal according to the third back pressure signal; and sending the fourth back pressure signal to the endpoint device through the PCIe channel.

8. The method according to claim 7, wherein generating, by the endpoint forwarding device, the fourth back pressure signal according to the third back pressure signal further comprises generating, by the endpoint forwarding device, the fourth back pressure signal according to the third back pressure signal when a sending buffer of the endpoint forwarding device reaches a first threshold.

9. A core forwarding device, wherein the core forwarding device comprises a processor and a memory coupled to the processor, wherein the memory is configured to store a program, and wherein the processor is configured to invoke the program stored in the memory in order to execute the following operations:

receive, through a first virtual channel in a peripheral component interconnect express (PCIe) channel, a first PCIe packet sent by a core device, wherein a first traffic class of the first PCIe packet is allocated by the core device according to a destination-end device of the first PCIe packet, wherein the first traffic class is in a one-to-one correspondence with the destination-end device, and wherein the first virtual channel is in a one-to-one correspondence with the first traffic class;

encapsulate, according to the destination-end device, the first PCIe packet into a first Ethernet frame that has a first priority;

send the first Ethernet frame to a network switching device through a first-priority channel that is in a one-to-one correspondence with the first priority and is in an Ethernet channel when a first-priority buffer that configured to store the first Ethernet frame is not under back pressure;
receive, through a second-priority channel in the Ethernet channel, a second Ethernet frame sent by the network switching device, wherein a second priority of the second Ethernet frame is in a one-to-one correspondence with the second-priority channel;
parse the second Ethernet frame to obtain a second PCIe packet, wherein a second traffic class of the second PCIe packet is in a one-to-one correspondence with a source-end device of the second PCIe packet; and
send the second PCIe packet to the core device through a second virtual channel that is in a one-to-one correspondence with the second traffic class and is in the PCIe channel when a first sending buffer that configured to store the second PCIe packet is not under back pressure.

10. The core forwarding device according to claim 9, wherein the processor is further configured to:
receive, through the first-priority channel, a first back pressure signal sent by the network switching device after the first Ethernet frame is sent to the network switching device through the first-priority channel that is in a one-to-one correspondence with the first priority and is in the Ethernet channel;
stop, according to the first back pressure signal, sending the first PCIe packet to the network switching device through the first-priority channel;
generate a second back pressure signal according to the first back pressure signal; and
send the second back pressure signal to the core device through the first virtual channel.

11. The core forwarding device according to claim 9, wherein the processor is further configured to:
receive, through the second virtual channel, a third back pressure signal sent by the core device after the second PCIe packet is sent to the core device through the second virtual channel that is in a one-to-one correspondence with the second traffic class and is in the PCIe channel;
stop, according to the third back pressure signal, sending the second PCIe packet to the core device through the second virtual channel;
generate a fourth back pressure signal according to the third back pressure signal; and
send the fourth back pressure signal to the network switching device through the second-priority channel.

12. The core forwarding device according to claim 10, wherein a sending buffer of the core forwarding device comprises a first-type sending buffer and a second-type sending buffer, wherein the first-type sending buffer is a buffer that is in a one-to-one correspondence with a specified virtual channel when the core forwarding device receives a specified packet through the specified virtual channel in the PCIe channel, wherein the second-type sending buffer is another buffer, other than the first-type sending buffer, in the sending buffer of the core forwarding device, and wherein the processor is further configured to:
generate the second back pressure signal when the first back pressure signal is to exert back pressure on the first-type sending buffer and when a volume of data stored in the first-type sending buffer exceeds a first threshold; and
generate the second back pressure signal when the first back pressure signal is to exert back pressure on the second-type sending buffer and when a volume of data stored in the second-type sending buffer exceeds the first threshold.

13. The core forwarding device according to claim 12, wherein after the second back pressure signal is generated when the first back pressure signal is to exert back pressure on the second-type sending buffer and when the volume of the data stored in the second-type sending buffer exceeds the first threshold, the processor is further configured to generate a specified back pressure signal when the volume of the data stored in the second-type sending buffer exceeds a second threshold, to exert back pressure on a first PCIe sending buffer in the core device, wherein the second threshold is greater than the first threshold.

14. An endpoint forwarding device, wherein the endpoint forwarding device comprises a processor and a memory coupled to the processor, wherein the memory is configured to store a program, and wherein the processor is configured to invoke the program stored in the memory in order to execute the following operations:
receive, through a first-priority channel in an Ethernet channel, a first Ethernet frame sent by a network switching device, wherein the first Ethernet frame has a first priority that is in a one-to-one correspondence with the first-priority channel;
parse the first Ethernet frame to obtain a first peripheral component interconnect express (PCIe) packet, wherein a first traffic class of the first PCIe packet is in a one-to-one correspondence with a destination-end device of the first PCIe packet;
send the first PCIe packet to an endpoint device through a PCIe channel when a first sending buffer that configured to store the first PCIe packet is not under back pressure, wherein the endpoint device is consistent with the destination-end device;
receive, through the PCIe channel, a second PCIe packet sent by the endpoint device, wherein a second traffic class of the second PCIe packet is in a one-to-one correspondence with the endpoint device;
encapsulate, according to the endpoint device, the second PCIe packet into a second Ethernet frame that has a second priority; and
send the second Ethernet frame to the network switching device through a second-priority channel that is in a one-to-one correspondence with the second priority and is in the Ethernet channel when a second-priority buffer that configured to store the second Ethernet frame is not under back pressure.

15. The endpoint forwarding device according to claim 14, wherein after the first PCIe packet is sent to the endpoint device through the PCIe channel, the processor is further configured to:
receive, through the PCIe channel, a first back pressure signal sent by the endpoint device;
stop sending the first PCIe packet to the endpoint device through the PCIe channel;
generate a second back pressure signal according to the first back pressure signal;
send the second back pressure signal to the network switching device through the first-priority channel;
receive, through the second-priority channel, a third back pressure signal sent by the network switching device after the second Ethernet frame is sent to the network switching device through the second-priority channel that is in a one-to-one correspondence with the second priority and is in the Ethernet channel;

stop sending the second Ethernet frame to the network switching device through the second-priority channel;

generate a fourth back pressure signal according to the third back pressure signal; and send the fourth back pressure signal to the endpoint device through the PCIe channel.

16. The endpoint forwarding device according to claim 15, wherein the processor is further configured to generate the fourth back pressure signal according to the third back pressure signal when a sending buffer of the endpoint forwarding device reaches a first threshold.

* * * * *